United States Patent [19]
Grendahl

[11] 4,047,689
[45] Sept. 13, 1977

[54] LOAD DISTRIBUTING TRACK FITTING

[75] Inventor: Bernard Elden Grendahl, Litchfield, Conn.

[73] Assignee: UOP Inc., Des Plaines, Ill.

[21] Appl. No.: 706,641

[22] Filed: July 19, 1976

[51] Int. Cl.² .................... B60N 1/00; B61D 45/00
[52] U.S. Cl. .............................. 248/503.1; 105/482
[58] Field of Search ................ 248/119 R, 424, 429, 248/500, 501, 503; 105/464, 465, 482

[56] References Cited

U.S. PATENT DOCUMENTS

| | | | |
|---|---|---|---|
| 3,212,457 | 10/1965 | Looker | 105/482 |
| 3,241,501 | 3/1966 | Watts | 105/482 |
| 3,306,234 | 2/1967 | Hansen et al. | 105/482 X |
| 3,377,040 | 4/1968 | Hansen | 248/119 R |
| 3,652,050 | 3/1972 | Marrujo et al. | 248/501 X |

FOREIGN PATENT DOCUMENTS 787,750  12/1957  United Kingdom ............ 248/119 R Primary Examiner—William H. Schultz
Attorney, Agent, or Firm—James R. Hoatson, Jr.; Barry L. Clark; William H. Page, II

[57] ABSTRACT

Track fitting for anchoring seats or cargo to a slotted floor track in an aircraft includes a plurality of spaced lobe portions which are adapted to be positioned so as to underlie retaining portions of the track to restrict upward movement of the fitting. Forward movement is restricted by shear pin means positioned so as to engage the track intermediate a pair of lobe portions. In a preferred embodiment, the fitting has four sets of lobes and two shear pins. The lobes are located in alternate pairs on first and second pivoted support plate means which are sandwiched together inside a housing and pivotally mounted fore and aft of the load attachment aperture in the housing so that the lobes and support plates can pivot under load to uniformly distribute the loading over an extended track length.

7 Claims, 9 Drawing Figures

U.S. Patent  Sept. 13, 1977  4,047,689
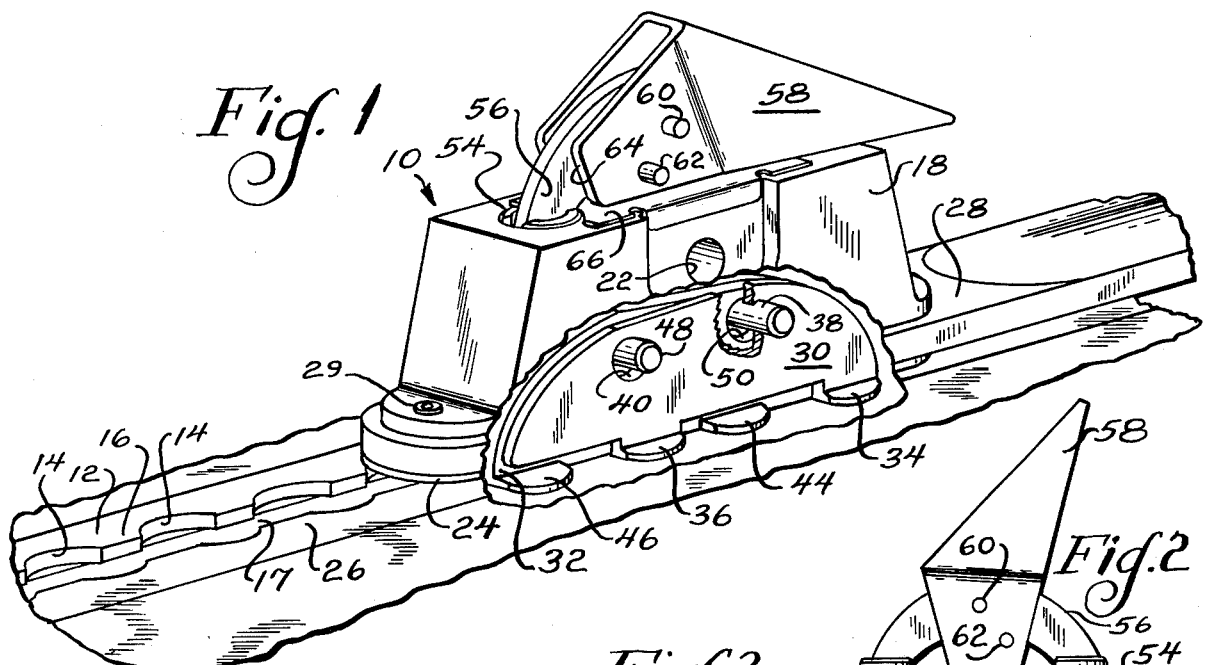
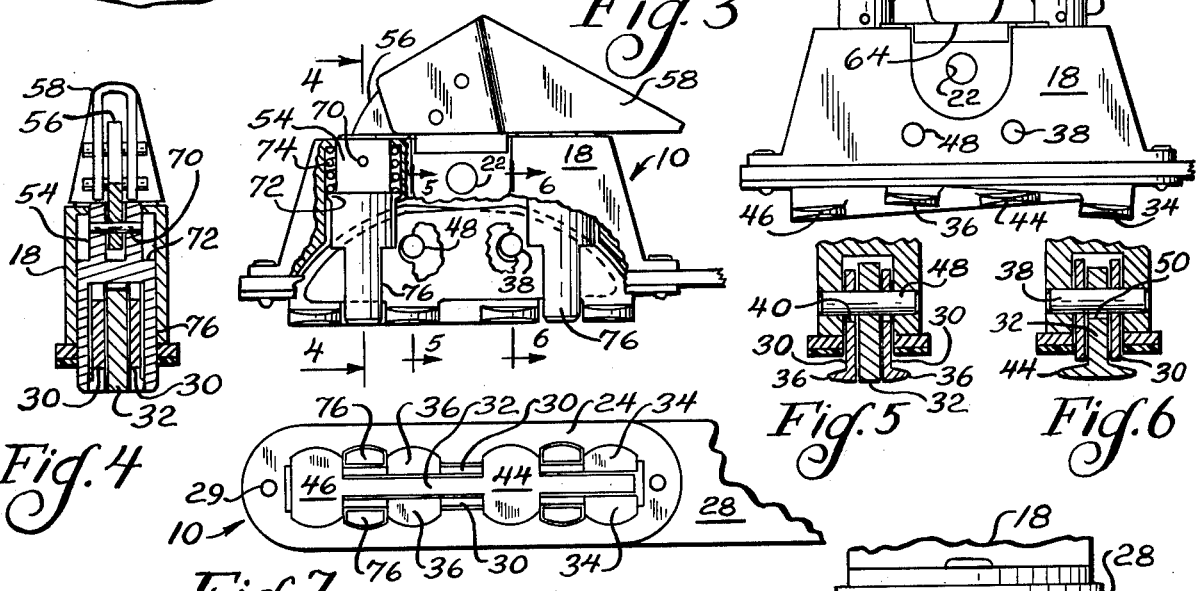
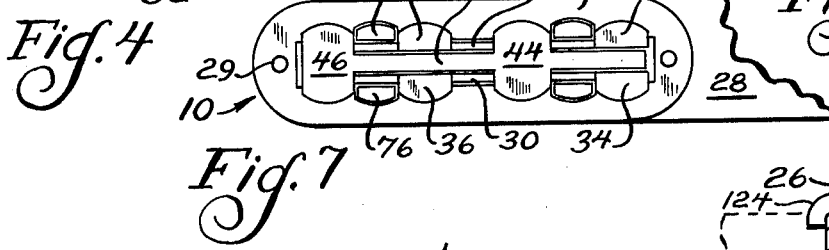
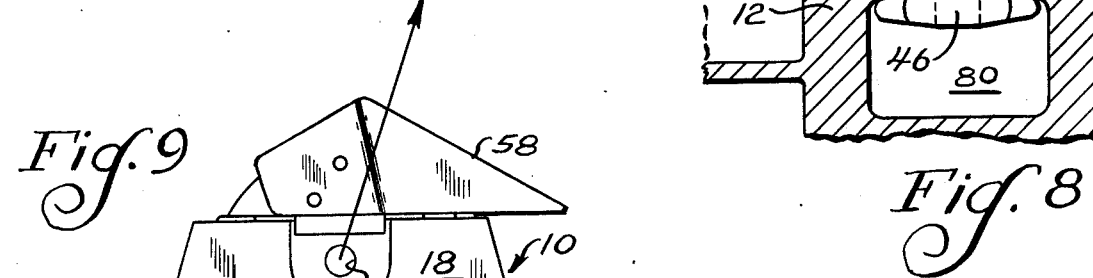
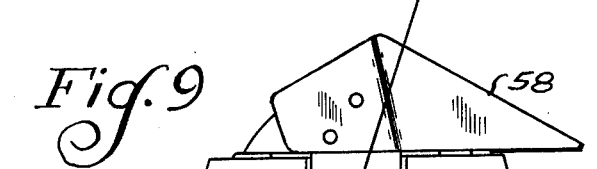
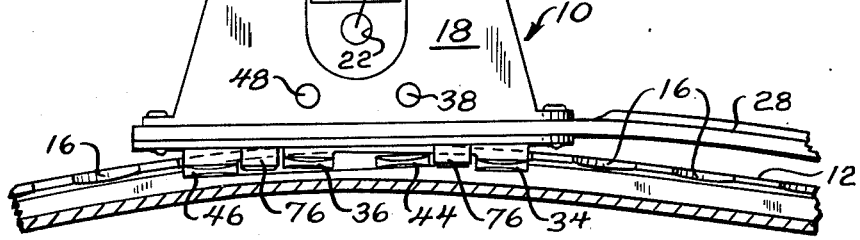

LOAD DISTRIBUTING TRACK FITTING

BACKGROUND OF THE INVENTION

The invention relates to track fittings for use in anchoring loads to the floor of aircraft. Typically, an aircraft floor includes a plurality of parallel, longitudinally slotted, channel-like tracks arranged flush with the floor down the length of the interior. The tracks have alternate wide and narrow openings which are commonly spaced at a one inch pitch so that fittings for anchoring seats or cargo can be located at any desired multiple inch increment along the length of the track. The fittings and associated track must typically be able to support 4000 pound vertical and 3600 pound horizontal loads. One commercially available fitting which meets these requirements comprises a housing which carries a vertically movable shear pin and an operating handle therefor at its forward end and a pair of threaded, headed retaining studs on one inch centers at its rearward end. The headed studs are adapted to be slid under retaining lips in the track and the shear pin is then lowered into the wider openings in the track to prevent forward movement. A transverse aperture is located in the housing midway between the studs for attaching a load to the fitting. Since the fittings being discussed are usually, when used on a seat, only used on the rear legs of the seat, the forces acting on the fittings in a crash situation will typically be forward and upward. These forces are resisted by the forward edge of the shear pin and the two studs with most of the vertical force being resisted by the rear stud as the fitting tends to pivot about the forward edge of the forwardly mounted shear pin. The forward stud can absorb very little of the load until the track and rear stud start to deflect. As the fitting starts to fail under load, the rear stud typically pulls out of the track, causing all of the vertical loading to be transferred to the front stud which then also pulls out.

Although the aforementioned fittings are sufficiently strong for use on each of the two legs of a double seat, they do not have sufficient strength to support a triple seat where the triple seat must be carried by the same two tracks as a double seat with one seat position cantilevered into the aisle. Increased density seating is being strongly considered as an alternative to the tremendous expense associated with the purchase of new aircraft and as a means to decrease the amount of fuel consumed per passenger mile. In one widebody aircraft presently utilizing an eight abreast seating configuration consisting of four double seats, capacity can be increased considerably by using a triple-quad-double configuration to provide nine abreast seating. However, the additional loading provided by the substitution of a two leg triple seat for a two leg double or a three leg quad seat for a pair of two leg doubles would necessitate that the front and rear legs of each seat be spaced apart by about 22 inches rather than the conventional 18 inches. When one considers that the seats are normally spaced at a pitch of only 32-36 inches or less, it is obvious that the small amount of aisle space in front of the seats could not comfortably accommodate rear seat legs which extend four inches further back into the aisle space than before. Alternatively, the seat track in the aircraft could be replaced with a much heavier track but the cost would be very high and the additional weight of the heavier track would increase operating costs and decrease the load capacity.

SUMMARY

It is among the objects of the present invention to provide an aircraft track fitting which has a substantially greater load carrying capacity than conventional fittings so that increased loads can be supported without increasing the fore and aft leg spacing distance.

It is another object of the invention to provide a track fitting which will distribute the loading relatively evenly over the engaged length of the track.

It is yet another object of the invention to provide a track fitting that, even though slightly heavier than conventional fittings, can result in a net weight saving by permitting the elimination of certain far heavier leg members.

The foregoing and other objects are attained by the track fitting of the present invention which is constructed as set forth hereinabove in the Abstract. By forming the four sets of load bearing lobes on three pivoted support plates so that alternate lobes pivot about different pivot support pins and so that pairs of lobes spaced two inches apart pivot about an axis positioned between them, the fitting is able to spread the loading relatively uniformly over a four inch length of track. Thus, the fitting is able to easily withstand static loads of 7000 pounds in an upward direction and 5000 pounds in a forward direction on a track that would fail if such loads were applied over only a 1 or 2 inch length. As the loading increases, the lobes tend to assume locations on a large radius circle as they uniformly deflect the track to a similar shape.

By using the track fitting of the present invention in place of conventional fittings, it is possible to support a triple seat with only two rearwardly extending legs, or a quad seat with only three rearwardly extending legs, all without increasing the fore and aft spacing of the legs of any seat. By use of the improved fitting, a particular eight abreast cabin configuration of a Douglas DC-10 aircraft can be changed from a capacity of 202 using all double seats to a capacity of 227 by going to a nine abreast configuration with a triple seat on one side of the cabin, a double on the other side, and a quad seat in the middle. The expanded capacity congifuration utilizes 25 triple seats, 22 quads and 32 doubles. With each triple seat requiring one of the improved track fittings disclosed herein and each quad requiring two improved fittings, 69 improved fittings having a total weight of about 26 pounds is added to the weight of the aircraft but 22 legs weighing about 50 pounds can be eliminated from the quads for a net weight saving of 24 pounds. In addition to the weight saving gained by eliminating a rear leg from each quad, passenger leg room is considerably enhanced by the absence of a leg.

BRIEF DESCRIPTION OF THE DRAWINGS

FIG. 1 is a partially broken away isometric view of the improved track fitting in assembled relation to a slotted floor track;

FIG. 2 is a side view of the track fitting with the shear pins retracted for clarity showing the positions assumed by the track engaging lobes when they are under maximum loading conditions;

FIG. 3 is a broken away side view of the track fitting with the shear pins in their operative position;

FIG. 4 is a rear end sectional view of the track fitting taken on line 4—4 of FIG. 3;

FIG. 5 is a sectional view of the track fitting taken on line 5—5 of FIG. 3;

FIG. 6 is a sectional view of the track fitting taken on line 6—6 of FIG. 3;

FIG. 7 is a bottom view of the track fitting;

FIG. 8 is a fragmentary end view showing the relationship between the retaining lugs of the track fitting and a seat track with a modified wear plate included; and FIG. 9 is a side view showing the relationship (exaggerated for clarity) between the fitting and a floor track under extreme loading conditions.

DESCRIPTION OF THE PREFERRED EMBODIMENT

Referring to FIG. 1, the improved track fitting indicated generally at 10 is shown in operative relationship with a slotted floor track 12 having a bottom wall portion, side wall portions, and top portions in which are formed a plurality of circular or concave wide openings 14 which are spaced from each other on one-inch centers and separated by retaining lip portions 16 which define a narrow space 17 between the retaining lip portions on opposite sides of the track. The track fitting 10 includes a housing portion 18 which is preferably formed of cast aluminum. The upper central portion of the housing 18 has a transverse aperture 22 extending therethrough. The aperture 22 is the point at which loads are attached to the fitting such as by means of a pin (not shown) passing through the aperture. Where the fitting is used to support the rear leg of a seat the opposite sides of the leg would extend generally in the direction of the arrow in FIG. 9 so as to overlie the aperture 22 and would be attached thereto by means of a bolt, for example. Where the fitting 10 is to be used to attach cargo to the floor of the aircraft, a clevis type member (not shown) can be attached to the aperture 22 with the cargo being attached to the fitting by means of straps or cables anchored to the clevis. A wear plate 24 of a wear-resistant material such as nylon may be attached to the bottom of the housing to facilitate sliding of the fitting over an upper track surface 26 on the floor track 12 during an assembly and disassembly operation. When the fitting 10 is to be used to anchor a seat, the front and rear legs (not shown) of the seat are generally tied together by means of a spreader member 28 which is attached to the fitting by means of rivets 29, for example. The spreader 28 firmly ties the rear legs and lockable fitting 10 to the front legs and thus obviates the need for any lockable fitting on the front leg.

The novel construction of the track fitting 10 which permits it to distribute the loading relatively evenly over the entire length of track with which it is engaged is provided by outer lug support plates 30 and an inner lug support plate 32. The outer plates 30 carry a forward outwardly extending lug 34 and a rearward outwardly extending lug 36. The support plates 30 are mounted for a limited degree of pivotal movement about a pivot pin 38 which may comprise a roll pin. Rotation of the support plate 30 about the pin 38 is limited by providing the plate with an elongated opening 40 which surrounds a second pivot pin 48 carried by the housing 18. The inner lug support plate 32 carries a forward lug 44 and a rearward lug 46, each of which extends outwardly to both sides of the plate (see FIG. 6) as compared to the lugs 34, 36 which extend outwardly to one side of the plate (see FIG. 5). The inner lug support plate 32 is mounted for pivotal movement about pivot pin 48 with its degree of permissible pivotal movement being limited by enlarged opening 50 which surrounds pin 38 and which is formed in plate 32. As can be seen in FIGS. 1-3, the lugs 34, 36 on plate 30 and the lugs 44, 46 on plate 32 are alternated with each other. The support plates 30, 32 are restricted in their pivotal movement by the enlarged openings 40, 50 which act as stops for the pins 48, 38 so that the lugs 34, 36 and 44, 46 can move between the position shown in FIG. 3 when there is little or no loading on the track fitting to the position shown in FIG. 2 which illustrates the position the lugs can take under extreme loading conditions (such as those illustrated in FIG. 9) where the loading is sufficient to deflect the track 12.

Referring to FIGS. 2 and 3, the shear pin members 54 which cooperate with the track 12 to prevent fore and aft movement of the fitting 10 are shown in their retracted and engaged positions, respectively. When the fitting 10 is to be assembled to the floor track 12, the shear pins 54 are lifted upwardly by a curved lift member 56 which is pivotally mounted to an over-center type handle member 58 by means of a pivot pin 60. As the handle 58 is lifted from its FIG. 3 position to its FIG. 2 position, a stop pin 62 carried by it engages the lift member 56 while the flat end surface 64 of the handle 58 bears against wear plate 66 to maintain the shear pins 54 in their raised position. The shear pins 54 are mounted to the lift member 56 by pins 70 and include a shoulder portion 72 which is engaged by a spring 74 to bias the pins 54 downwardly. The shear pins 54 are bifurcated so as to provide spaced apart track engaging surfaces 76 (see FIGS. 4 and 7) which straddle the inner and outer lug support plates 32, 30.

FIGS. 5 and 6 are cross-sectional views through the pivot pins 48, 38 respectively and show the relationship of said pins to the support plates 30, 32 and to the enlarged openings 40, 50.

FIG. 7 is a view of the underside of the fitting 10 and helps illustrate the manner in which the fitting is assembled to the floor track 12.

The assembly of the fitting 10 to a floor track 12 is as follows: with the shear pins 54 retracted as shown in FIG. 2 by lifting the handle 58, the lugs 34, 44, 36 and 46 are dropped through the holes 14 in the track 12 (FIG. 1) so that the wear plate 24 rests on the upper track surface 26. The entire fitting 10 is then moved fore or aft approximately ½ inch so as to cause the lugs to be positioned under the retaining portions 16 on the track while simultaneously bringing the shear pins 54 into alignment with a pair of wide openings 14 on the track. The handle 58 is then pressed downwardly to its FIG. 3 position, permitting the shear pins 54 to move downwardly under the pressure of springs 74 so that the lower outer surfaces 76 thereof pass into the respective openings 14 with which they have been aligned and engage the sides thereof so as to prevent fore and aft movement of the fitting in the track.

FIG. 8 is a cross-section of a track 12 of the type shown in FIG. 1 which illustrates the assembled relationship between the lug 46 and the retaining portions 16 which prevents vertical movement of the fitting. The track 12 has a relatively deep channel 80 formed along its length, which, in addition to providing support for track fittings, provides a conduit for the cables which carry audio signals for an in-flight entertainment system to the several seats supported on the track 12.

The wear track 124 attached to the housing 18 in FIG. 8 is a modification of the wear plate 24 shown in the other figures in that it is formed of metal which is bent downwardly so as to overlie the sides of the track 12. The downturned extensions of the modified wear plate provide additional restraining force to help prevent the lugs, such as the lug 46, from forcing the sides of the track apart as the lug and fitting are pulled upwardly by the loading exerted during a crash, for example. The spreader members 28 could also be formed with downwardly turned edges to overlie the sides of the track fitting 12 and perform a similar retaining function.

FIG. 9 shows the relationship, exaggerated for clarity, between a track fitting 10 and a floor track 12 under maximum loading conditions when the loading is exerted in the direction indicated by the arrow. The shear pin surfaces 76 resist forward movement while the outer lugs 34, 36 pivot on their support plate 30 (FIG. 1) about pivot point 38 to provide uniform loading between an alternately spaced pair of retaining lip portions 16 which comprises the first and third of any set of four consecutively spaced retaining lip portions. Similarly, the lugs 44, 46 engage an alternately spaced pair of retaining portions 16 which comprises the second and fourth of any such set and pivot on their support plate 32 about pivot pin 48 so as to divide the load between them.

I claim as my invention:

1. A track fitting for use with a slotted floor track of the type used in aircraft wherein said track has a bottom portion, vertical side portions, and top portions carried by each of said side portions and defining the side edges of a longitudinal slot which overlies the bottom and is spaced therefrom, so as to define an open channel, said top portions on each side of said slot being formed so as to define a plurality of alternately spaced retaining lip portions and concave relieved portions, said track fitting comprising an elongated housing having a length at least as great as the axial distance between four of said spaced retaining lip portions, aperture means in an upper portion of said housing for anchoring a load to said fitting, a plurality of lobe members mounted within said housing, said lobe members being shaped so as to be capable of being dropped vertically through a plurality of said concave relieved portions in said track and then moved axially with said housing along the track to bring said lobe members under the retaining lip portions, a pair of spring loaded shear pins mounted in said housing, said shear pins being capable of being moved downwardly into two of said plurality of concave relieved portions in said track when said lobes underlie said retaining lip portions to contact the edges of said concave relieved portions and restrict horizontal movement of said fitting in said track while said lobe members contact the underside of said retaining lip portions to restrict upward movement, a pair of horizontal, transverse pivot members mounted in said housing at spaced locations along the length thereof, the first of said pivot members providing the support for first pivoted support plate means which carry the lobe members which are adapted to engage the first and third of any four consecutively axially spaced lip portions in said track and the second of said pivot members providing the support for second pivoted support plate means which carry the lobe members which are adapted to engage the second and fourth of said four consecutively axially spaced lip portions in said track.

2. A track fitting according to claim 1 wherein each of said first and second pivoted support plate means includes an opening spaced from its own pivot member which surrounds the other pivot member and has a larger diameter than said other pivot member, the opposed sides of said opening being adapted to be alternately contacted by said other pivot member to limit the range of pivotal movement of said support plate means.

3. A track fitting according to claim 1 wherein a pair of outer support plate members are pivoted on one pivot member and a single inner support plate member is pivoted on the other pivot member.

4. A track fitting according to claim 3 wherein the lobe members on the inner support plate member extend to each side of said inner support plate member while the lobe members on the outer support plate members extend only to the outer side of said outer support plate members.

5. A track fitting according to claim 1 wherein said shear pins have their lower ends bifurcated so as to extend over the outer side edges of said support plate means.

6. A track fitting according to claim 1 wherein a wear plate is attached to the bottom of said housing to facilitate the sliding of said track fitting on a track.

7. A track fitting according to claim 6 wherein said wear plate has downwardly extending side portions which are adapted to partially overlie the side wall portions of a track.

* * * * *